United States Patent Office 3,510,178
Patented May 5, 1970

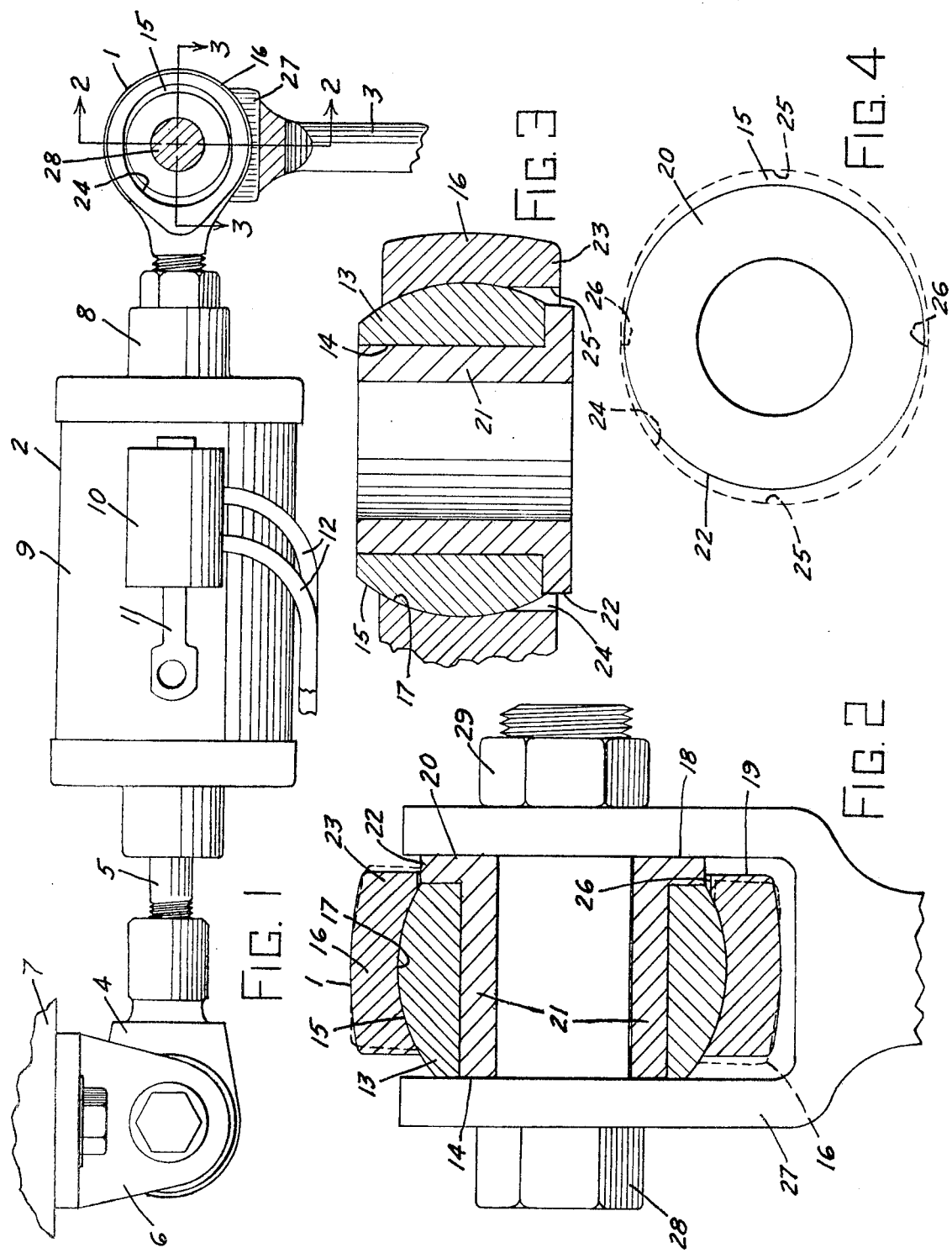

3,510,178
SPHERICAL BEARING WITH INTEGRAL ROTATION LIMITING MEANS
Ronald C. Sowatzke, Canoga Park, Calif., assignor to Rex Chainbelt Inc., Milwaukee, Wis., a corporation of Wisconsin
Filed June 6, 1968, Ser. No. 735,012
Int. Cl. F16c 9/06, 11/00
U.S. Cl. 308—72    3 Claims

ABSTRACT OF THE DISCLOSURE

A spherical support bearing for a linear actuator has abutment means on the outer and inner races of the bearing which are engageable to restrict misalignment of the actuator in a plane normal to the motion thereof, but which allow substantially unrestricted rotation and misalignment in other directions.

BACKGROUND OF THE INVENTION

(1) Field of invention

The present invention relates to spherical bearings and particularly to spherical bearings of the type used to form a pivotal connection between a linear actuator and the lever arm of a machine element to be actuated. The bearing of the present invention is further of the type provided with means to restrict motion of the actuator in a plane normal to the motion thereof.

(2) Description of the prior art

It is known in the art to provide means for preventing or limiting the rotation of a pneumatic or hydraulic linear actuator operatively mounted between two spherical bearings. It is frequently desirable in this type of application to prevent rotation of the actuator about its longitudinal axis in the plane normal thereto and yet to allow movement or misalignment of the actuator in other directions. Anti-rotation means such as guide rails and double clevis joints have been used in association with actuator mechanisms. These require additional parts, more space, and add to the weight of the system, all of which are undesirable particularly in the frequent application of these mechanisms to the control system of an aircraft.

Anti-rotation means integral with the spherical bearing itself are also known in the art. Rotation pads machined on the faces of the outer race or the housing of the bearing in the plane normal to the motion of the actuator are used as abutments or stops to restrict rotation of the actuator. Since rotation pads operate to restrict rotation by engaging the adjacent face of a clevis or other means forming a connection to the actuator, udesirable stresses are often imposed in the connecting means.

In another anti-rotation means a circumferential groove or raceway is machined in the surface of the inner race to cooperate with abutments carried by the outer race. The abutments are fixed in position with respect to the outer race but are free to move within the raceway with rotation of the inner race. The inner race is thus free to rotate within the outer race in any direction except in the plane defined by the abutments and the axis of the bearing. The bearing is mounted so that said plane lies normal to the motion of the actuator. This type of bearing requires considerable machining and the required groove substantially reduces the bearing area.

SUMMARY OF THE INVENTION

The present invention provides a spherical bearing adapted to form the pivotal connection between a linear actuator and an element to be actuated. Means integral to the bearing are provided to limit rotation of the actuator in the plane normal to the linear motion thereof. The spherical inner race of the bearing has a circular shoulder extending from one edge thereof and the spherical outer race has a shoulder provided with an oblong inner peripheral surface. The shoulder of the outer race surrounds the circular shoulder of the inner race such that the portions of the oblong surface across the shortest dimension thereof lie closely spaced from diametrically opposite portions of the surface of the circular shoulder. The closely spaced portions of the circular inner surface and the oblong outer surface form abutment means which with the center of the bearing define the plane in which the least relative movement between the inner and outer races can occur. The bearing is secured to one end of the actuator such that the above described plane of limited rotation lies normal to the direction of motion of the actuator.

Because the abutment means are integral with the bearing no additional anti-rotation structure is required and no undesirable engagement between the bearing and connecting members occurs. Since the oblong inner peripheral surface of the shoulder of the outer race may be formed by two semicircular surfaces joined by common tangential surfaces, the machining thereof is relatively, simple. At most, only one part in addition to those comprising a common metal-to-metal spherical bearing is required.

BRIEF DESCRIPTION OF THE DRAWING

FIG. 1 is a side elevational view of a portion of a servomechanism of the type used in the control system of an aircraft showing a bearing of the present invention operatively connecting one end of the linear actuator and the lever arm of the element to be actuated.

FIG. 2 is an enlarged partial sectional view taken on line 2—2 of FIG. 1 and additionally showing by broken lines the engagement of the abutment means in the plane of limited rotation.

FIG. 3 is an enlarged sectional view of the bearing taken on line 3—3 of FIG. 1.

FIG. 4 is an enlarged side elevational view of the inner member of the bearing shown in FIG. 1 and additionally showing by a broken line the inner peripheral surface of the outer member.

DESCRIPTION OF THE PREFERRED EMBODIMENT

As shown in FIG. 1, a bearing 1 of the present invention is particularly adaptable for use in a servomechanism wherein a hydraulic linear actuator 2 is employed to impart reciprocating motion to the lever arm 3 of a machine element (not shown) to be actuated. The type of actuator mechanism shown is used, for example, to operate the ailerons or other control surfaces of an aircraft.

In a typical servo-system shown in FIG. 1, a plain spherical rod-end bearing 4 pivotally connects the piston rod 5 of the actuator 2 to a clevis 6 or other supporting means. The clevis 6 is bolted or otherwise secured to a stationary structural member 7. The bearing 1 of the present invention, as shown, is a rod-end type of bearing, and is threaded into the head 8 of the cylinder 9 of linear actuator 2.

The actuator 2 is controlled by a two-way hydraulic valve 10 mounted on cylinder 9. The valve 10 is operated by reciprocation of the control rod 11 through a linkage attached thereto (not shown). Since the piston rod 5 is prevented from moving because of its connection to the spherical rod-end bearing 4, the actuator 2 and the attached bearing 1 will move back and forth along the piston rod 5 as the valve 10 is operated.

Along with reciprocation, there is a tendency for the actuator 2 to rotate about its longitudinal axis. This rotational tendency is attributable to a number of factors such as the offset mounting of the valve 10, drag produced by the attached hydraulic hoses 12, and the weight of the control linkage attached to the control rod 11. It is desirable to limit or prevent rotation of the actuator in order to maintain the hoses and control linkage in proper alignment and thereby eliminate torsional fatigue of these elements and reduce clearance requirements.

The bearing 1 of the present invention provides means to restrict or limit rotation of the actuator 2 in the plane normal to the direction of movement thereof. The bearing 1 has an inner member 13 provided wih a central bore 14 and a spherical outer bearing surface 15 the center of which lies on the axis of the bore 14. An outer member 16 has a spherical inner surface 17 in bearing engagement with the outer surface 15 of the inner member 13. To limit rotation of the outer bearing member 16 with respect to the inner bearing member 13 in the plane normal to the direction of motion of the actuator 2, and thus limit the rotation of the actuator, the bearing 1 is provided with first and second abutment means 18 and 19 respectively.

The first abutment means 18 comprises a circular extension 20 of the inner member 13. In its preferred embodiment and as best shown in FIGS. 2 and 3, the circular extension 20 comprises a flange or shoulder at the end of a cylindrical sleeve 21 which is pressed tightly into the bore 14 of the inner member 13. It will be appreciated, however, that the circular extension 20 could alternately be formed as an integral extension of the inner member 13 or as a ring fitted around a cylindrical extension of said inner member. The outer peripheral surface 22 of the circular extension 20 is frusto-conical and converges outwardly of the bearing.

The second abutment means 19 is formed as an integral extension 23 of the outer member 16. An oblong inner peripheral surface 24 is machined on the end of the integral extension 23. The inner peripheral surface 24 partially overlaps and completely surrounds the outer peripheral surface 22 of the circular extension 20. The oblong surface 24 is defined by two semi-circular surfaces 25 of equal diameter, but having spaced centers, joined by flat common tangential surfaces 26. The inner peripheral surface 24 could also be formed in the shape of an ellipse.

The tangential surfaces 26 are parallel to each other, and the outer member and second abutment means 19 are so oriented when the bearing is attached to the actuator 2 that the surfaces 26 are parallel to the longitudinal axis of said actuator. The inner bearing member 13 is attached to the lever arm 3 by mounting the bearing in the lever arm clevis 27 and inserting a bolt 28 through the bore of of sleeve 21. A nut 29 or other fastening means is used to secure the bearing in the clevis 27.

As best shown in FIGS. 2 and 4, the portions of the inner peripheral surface 24 which lie most closely adjacent the outer peripheral surface 22 of the circular extension 20 are the midpoints of the tangential surfaces 26. These midpoints and the center of the bearing 1 define a plane which is normal to the longitudinal axis or direction of motion of the actuator 2; this is the plane in which it is desirable to restrict or limit rotation of the actuator, as described previously. Thus, as the actuator is extended and tends simultaneously to rotate due to the described external forces acting thereon, the outer member 16 of the bearing and the attached actuator will misalign in the plane normal to the motion of the actuator only a very slight amount. Any significant misalignment in the described plane is prevented by contact or abutment of the mid-portions of the tangential surfaces 26 against the outer peripheral surface 22 of the circular extension 20, as shown by the broken lines in FIG. 2.

The outer peripheral surface 22 of the circular extension 20 is frusto-conical and outwardly convergent so that in the situation of maximum misalignment in the plane normal to the direction of motion of the actuator, there is line contact between the surfaces 22 and 26 across the full width of the latter. Thus, the optimum abutment between surfaces 22 and 26 occurs along lines in the plane in which restriction of rotation is desired.

Relative motion between the inner and outer members, 13 and 16 is, of course, unrestricted to the extent necessary in the two planes normal to the plane of limited motion. That is, the semicircular surfaces 25 and the spacing between their respective centers are such that substantially complete freedom of rotation and self-alignment in other directions is maintained.

It can be seen, particularly with reference to FIG. 4, that the distance between tangential surfaces 26 may be varied as desired by varying either the length of the diameters of the semicircular surfaces 25 or the distance between their respective centers. In this manner the amount of misalignment in the plane of restricted rotation may be established as desired.

While the invention has been particularly shown and described with reference to a preferred embodiment thereof, it will be understood by those skilled in the art that various changes in form and details may be made therein without departing from the spirit and scope of the invention.

What is claimed is:

1. In a support bearing for a linear actuator having an inner member with a spherical outer bearing surface and a central bore by which the member is adapted to be fixed to a machine element to be actuated, and an outer bearing member with a spherical inner surface in bearing engagement with the inner member and adapted to be fixed to one end of the actuator, the improved means for limiting rotation of the outer member about the inner member in the plane normal to the line of actuation comprising an annular flange on one end of said inner member, said flange having an outer peripheral surface adjoining said spherical outer bearing surface, and an integral axial extension of said outer bearing member, said extension having an oblong inner peripheral surface disposed in axially diverging spaced relation to said outer peripheral surface, the minor axis of said inner peripheral surface lying in said plane and the angle of divergence between said outer and inner peripheral surfaces in the aligned position being equal to the maximum angle through which said outer member may misalign with respect to said inner member in said plane, whereby rotation of the outer member about the inner member in said plane is limited by line contact between said outer and inner peripheral surfaces.

2. A bearing as defined in claim 1 wherein the outer peripheral surface of said annular flange is frusto-conical and forms an angle with the axis of said inner member equal to said angle of diverence.

3. A bearing as defined in claim 2 wherein said oblong inner peripheral surface comprises semicircular surfaces extending about spaced centers and intermediate planar surfaces tangentially joining said semicircular surfaces, the line defined by said centers being normal to said plane.

References Cited

UNITED STATES PATENTS

| 1,562,130 | 11/1925 | Stitzinger | 308—72 |
| 2,475,393 | 7/1949 | Keahey | 308—72 |
| 2,767,034 | 10/1956 | McCloskey | 308—72 |
| 3,401,964 | 9/1968 | Johnson | 308—72 X |

MARTIN P. SCHWADRON, Primary Examiner

L. L. JOHNSON, Assistant Examiner

U.S. Cl. X.R.

287—88